Patented Dec. 19, 1933

1,940,036

UNITED STATES PATENT OFFICE 1,940,036

BEVERAGE PRODUCT AND METHOD OF PRODUCING THE SAME

Clarence P. Wilson, Pomona, and James A. Finley, Claremont, Calif., assignors to California Fruit Growers Exchange, Los Angeles, Calif., a corporation of California No Drawing. Application June 29, 1927
Serial No. 202,459

11 Claims. (Cl. 99—5)

This invention relates to a new and improved beverage product and process of producing the same. This application is a continuation in part of our copending application filed January 27, 1927, Serial No. 164,122.

For many years, manufacturers of malted milk and similar products, such as milk modifiers, infant foods, invalid foods, etc., have sought a method of giving to their products certain qualities. For instance, it has been desired to give certain physical characteristics to the beverages made from malted milk, among which are increased viscosity or heavier body, a smoother texture, a more uniform suspension of undissolvable solids, a much slower settling of undissolved solids, a better retension of air or gas bubbles within the body of the beverage, and the production of a more stable foam.

It has also been an object to prepare malted milk or similar products, such as milk modifiers so that milk, when taken into the stomach, will coagulate in fine, easily digested flocs rather than in large stringy or tough curd masses. In malted milk beverages as ordinarily dispensed, ice cream which usually contains gelatin is relied on to give the beverage body, smoothness and stability.

We have discovered that pectin when used in malted milk, infant foods, invalid foods, or other modified milk preparations, is adapted to increase substantially the viscosity or body of the beverage, producing a beverage of smoother texture and forms a more uniform suspension of undissolved solids. As a result, a beverage utilizing pectin has a much slower settling of undissolved solids, a better retention of air or gas bubbles within the body of the beverage, and produces a more stable foam. The beverage also is conditioned so that when it is taken into the stomach, the milk therein will coagulate in fine, easily digested flocs rather than in large stringy or tough curd masses. The pectin also enhances the flavor and palatability of the beverage.

The beverage of the present invention requires less ice cream in order to give the usual smoothness and body. Moreover, in the production of dried products for the manufacture of the beverage, the use of pectin has the further advantage that the product is rendered less hygroscopic than similar materials made without pectin.

In the practice of the invention, the pectin used may be any satisfactory grade of any commercial pectin product which contains no substances that can be injurious to the finished product. Pectin made according to the process disclosed in United States Letters Patent No. 1,497,884 is satisfactory, or pectin produced by precipitation by means of alcohol may be used. If pectin is incorporated in the milk solution before drying, a solution of pectin may be used instead of a dry pectin product. Such pectin solution may be made by dissolving the pectous substance in water, milk, or other suitable liquid, or may be a pectin extract produced directly from a suitable source such as lemon or orange peel, apple pomace, etc. It is not essential that a dry pectin preparation be used.

One method of producing the product which is the subject of the present invention is as follows: If a dry pectin preparation and a dry malted milk preparation, for example, are available, it is sufficient simply to make an intimate, uniform mixture of the pectin preparation and the malted milk in the desired proportion. We use the term malted milk hereafter and in the claims as including any modified milk whether whole milk, skim milk, fresh, condensed, dried or malted milk, or artificial milks or materials, and include in the term malted milk, such products whether they conform sufficiently with the standard of solids and fats required for marketing under the term malted milk or not. Any amount of pectin from 1 per cent, to 25 per cent. or more of the finished product may be used but we have found that a very satisfactory proportion is between 7 and 8 per cent. of pectin. The percentage of pectin desirable to employ is, however, dependent upon the grade of the pectin. Different pectin products possess different jellifying powers and the proportion given is for a pectin preparation known as 160 grade, that is, such a pectin which if used to make jelly would require 160 times its weight of sugar in producing a standard quality fruit jelly containing 65 per cent. of sugar. If the pectin preparation has a lower or higher jelly strength, more or less of the pectin should be employed for the preparation.

A much more thorough and uniform distribution of the pectin is secured if, instead of mixing the dry ingredients, the pectin is dissolved in a milk or malted milk solution before drying and the same is then dried and reduced to powdered form by any suitable process, such as by means of a spray drier, a vacuum drum drier, evaporation in vacuum pans, etc.

Instead of dissolving a dry pectin preparation in a malted milk solution, a prepared solution of pectin of known quality may be mixed with the malted milk solution and the resulting mixture dried as mentioned above.

When producing the beverage product in accordance with the last two mentioned methods, the pectin is uniformly dispersed so that it is adapted to render the powdered product less hygroscopic and thus helps to preserve any fats or other products employed therein. In producing a dried product, care must be taken not to injure the valuable powers or properties of the pectin during drying, but ordinarily any process which is carried on at sufficiently low temperatures or under proper conditions to produce a good grade of dried malted milk will not be harmful to the pectin.

The dried product, whether originally prepared by merely mixing dry pectin and dry malted milk together, or by drying pectin and malted milk together, may be readily utilized for the manufacture of modified or malted milk beverages in which the beverage produced has substantially increased body, smoothness and stability, and enhanced flavor and palatability. The pectin itself has no flavor but it brings out in a distinct and agreeable way the flavor and palatability of the malted milk beverage.

It is obvious that the beverage either in the dried form or base or in the liquid form, may contain numerous other ingredients for the purpose of flavoring or improving the same, such as sugar, chocolate, vanilla, ice cream, etc., all without substantial effect upon the present invention.

While we have described herein a preferred product and process of producing the same, it is understood that various modifications may be made in both the product and process without departing from the principles of our invention and all such modifications and changes come within the scope of the following claims.

We claim:

1. A beverage product in finely divided form comprising a modified milk product and pectin, said pectin being present in quantities sufficient to prevent solids present in said product from agglomerating and separating for an appreciable time after said beverage product is dispersed in an aqueous liquid.

2. A beverage product in substantially dry, powdered or finely divided form comprising a modified milk product and from 1% to 25% of pectin, said pectin being adapted to maintain solids present in said product in uniform suspension for an appreciable time after said beverage product is dispersed in an aqueous liquid.

3. A beverage product in finely divided form comprising a malted milk product and pectin, said pectin being present in quantities sufficient to maintain solids present in said product in uniform suspension for an appreciable time after said beverage product is dispersed in an aqueous liquid.

4. A beverage product in substantially dry, finely divided form comprising a malted milk product and about 7-8% of pectin, said pectin being adapted to maintain solids present in said beverage product in uniform suspension for an appreciable time after said beverage product is dispersed in an aqueous liquid.

5. A beverage comprising an aqueous suspension and solution of modified milk products, flavoring solids and pectin, the solids remaining in substantially uniform suspension for an appreciable length of time by reason of the presence of the pectin.

6. A beverage comprising an aqueous suspension and solution of modified milk products and undissolved non-colloidal solids, said beverage containing pectin, whereby the solids present in said beverage are prevented for an appreciable length of time from agglomerating and separating from the aqueous phase.

7. A beverage comprising an aqueous suspension and solution of modified milk products and a cocoa product, said beverage containing pectin, whereby solids present in said beverage are prevented for an appreciable length of time from agglomerating and separating from the aqueous phase.

8. A beverage comprising an aqueous suspension and solution of malted milk and flavoring solids, said beverage containing pectin in quantities sufficient to maintain the solids in substantially uniform suspension for an appreciable time.

9. A method of producing an improved beverage product comprising dissolving a pectin-containing substance in a solution of modified milk products, and then drying the mixture to produce a beverage base in finely divided form.

10. A method of producing an improved malted milk beverage product which consists in dissolving a pectin-containing substance in a malted milk solution, and drying the mixture to produce a finely divided beverage product adapted to be dispersed in aqueous liquids and be uniformly suspended therein for an appreciable length of time without any appreciable agglomeration of solids taking place.

11. A method of producing an improved beverage product comprising mixing a solution of pectin with a solution of modified milk products, and then drying the resulting mixture to form a beverage product in substantially dry, finely divided form.

CLARENCE P. WILSON.
JAMES A. FINLEY.